United States Patent [19]
Kubacsi et al.

[11] Patent Number: 6,023,646
[45] Date of Patent: Feb. 8, 2000

[54] LIQUID CRYSTAL DISPLAY DEVICE FOR A BICYCLE

[75] Inventors: Michel Kubacsi, La Poyat du Chene; Bruno Montagnon, Route Nationale, both of France

[73] Assignee: MAVIC S.A., Saint Trivier sur Moignans, France

[21] Appl. No.: 09/168,871

[22] Filed: Oct. 9, 1998

[30] Foreign Application Priority Data

Oct. 10, 1997 [FR] France ................................ 97 13082

[51] Int. Cl.⁷ .............................................. F16H 63/00
[52] U.S. Cl. ................................ 701/1; 340/432; 474/78
[58] Field of Search ............................. 701/1; 340/432; 474/78

[56] References Cited

U.S. PATENT DOCUMENTS

| | | | |
|---|---|---|---|
| 4,490,127 | 12/1984 | Matsumoto et al. | |
| 4,642,606 | 2/1987 | Tsuyama | 340/432 |
| 4,862,395 | 8/1989 | Fey et al. | 702/146 |
| 5,213,548 | 5/1993 | Colbert et al. | 474/71 |
| 5,357,177 | 10/1994 | Fey et al. | |
| 5,358,451 | 10/1994 | Lacombe et al. | |
| 5,621,382 | 4/1997 | Yamamoto | 340/432 |
| 5,629,668 | 5/1997 | Downs | 340/432 |
| 5,847,641 | 12/1998 | Jinbo | 340/432 |
| 5,903,214 | 5/1999 | Watarai | 340/432 |

FOREIGN PATENT DOCUMENTS

| 0641711 | 3/1995 | European Pat. Off. |
|---|---|---|
| 95/26900 | 10/1995 | WIPO |

Primary Examiner—William A. Cuchlinski, Jr.
Assistant Examiner—Olga Hernandez
Attorney, Agent, or Firm—Greenblum & Bernstein, P.L.C.

[57] ABSTRACT

A display device provided to be associated, on the one hand, with an electric gearshift, and, on the other hand, with at least one sensor of at least one performance parameter of the bicycle or the cyclist. The gearshift is provided to emit a confirmation signal that a requested displacement did occur. This signal is sent to a processing circuit which elaborates information relative to the sprocket called, then sends this information to a display manager. During a period predetermined by a time delay, the display manager blackouts one of the current displays from the display unit and sends the information relative to the sprocket called to the display.

7 Claims, 3 Drawing Sheets

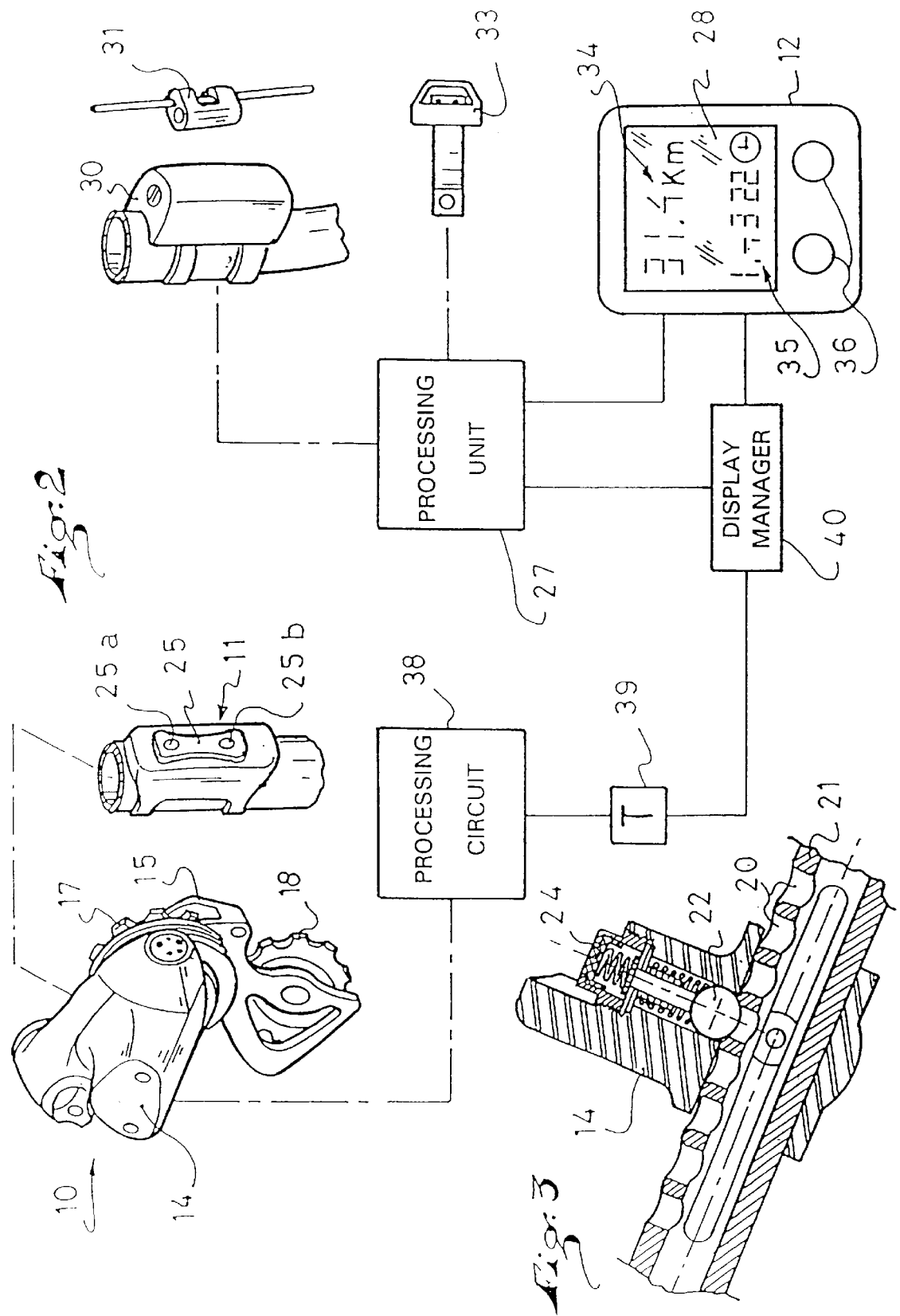

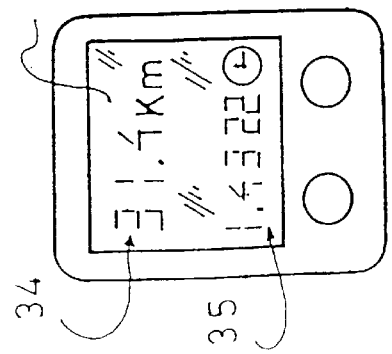
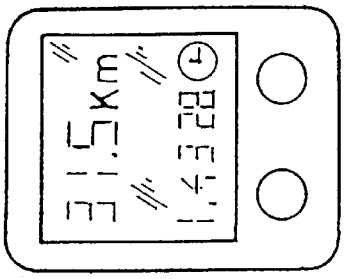
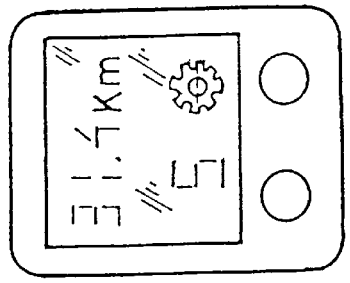
Fig. 4
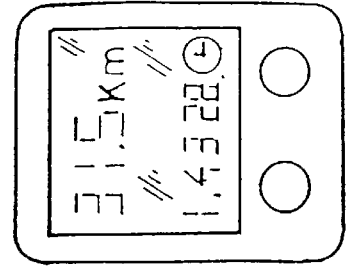
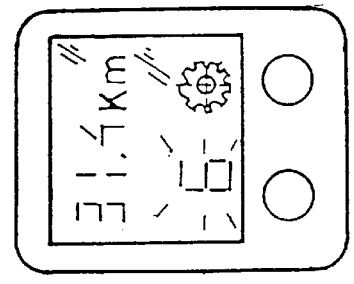
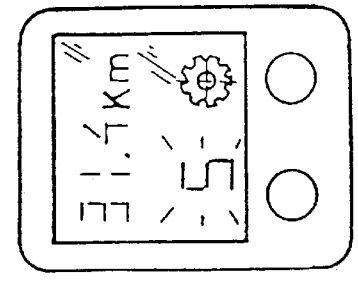
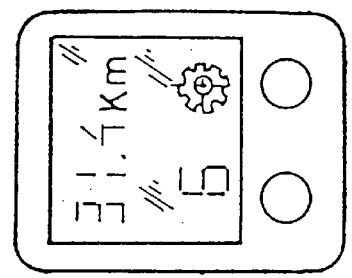
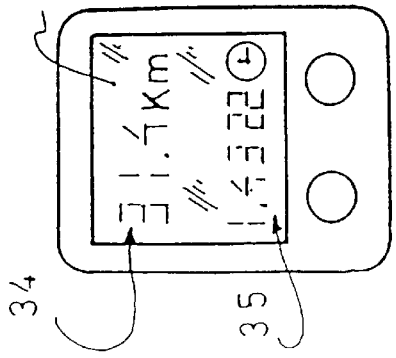
Fig. 5

LIQUID CRYSTAL DISPLAY DEVICE FOR A BICYCLE

BACKGROUND OF THE INVENTION

1. Field of the Invention

The present invention relates to a liquid crystal display device for a bicycle.

2. Description of Background and Material Information

A display device of the aforementioned type is known to include a display unit, which is generally attached to the handlebars of a bicycle, and a processing unit which is connected to sensors and which has calculation means. Such a device informs the cyclist of parameters pertaining to his or her route and performance, in particular the instantaneous speed, the average speed, the distance traveled, the time elapsed, etc.

As is also known, the information is displayed digitally and as a pictograph which informs the cyclist of the type of information displayed.

As the case may be, one or several types of information can be present in the display unit, and the cyclist has the possibility of calling different types of information to the display, for example, by pressing on a push-button integrated into the display.

A display device of this type, associated with a gearshift control mechanism, is known from European Patent Application No. 641 711. In the case of gearshift control, the current display is momentarily replaced with the number of the sprocket to which the chain is to be transferred. After a predetermined time lapse, the previous display reappears.

Such a device is advantageous, since with no intervention other than the gearshift control, the cyclist is informed of the sprocket towards which the chain will be displaced.

However, it has a certain number of disadvantages. First of all, the device reacts to the gearshift control, and not to the displacement of the gearshift itself.

Furthermore, the sprocket number information is given by the gearshift control box, as a function of the displacement of the control lever or of its position.

This device is therefore not adapted to an electric type gearshift, such as known from the published Patent Application No. 558 425, for example. Indeed, for such a gearshift, gear shifting is controlled by an impulse on one or the other of the two push-buttons. The sprocket number information therefore cannot be read at the level of the gearshift control. Moreover, for an electric gearshift like this one, the displacement of the mobile gear shifting assembly does not instantaneously follow the command.

Additionally, for electric gearshifts, it is possible to use several control switches located in different areas of the bend, or, if necessary, of the frame.

The device described in European Patent Application No. 558 425 is not compatible with such a multiple control of the gearshift.

SUMMARY OF THE INVENTION

An object of the invention is to propose an improved display unit which informs of a sprocket change in real time.

Another object of the invention is to propose an improved display unit which is well adapted for an electric type gearshift and for a multiple control.

Other objects and advantages of the invention will appear in the following description.

The display device according to the invention is provided to be associated, on the one hand, with an electric gearshift having at least one control switch, a mobile gear shifting assembly, means for a step by step reversible displacement of the mobile assembly, and, on the other hand, with at least one sensor of at least one performance parameter of the bicycle or of the cyclist, or one parameter external to the bicycle or the cyclist, the unit itself having means for processing the different parameters picked up by the sensors, a display unit with at least one screen for displaying one of the parameter values calculated by the processing unit. It has a processing circuit connected to the means for detecting the displacement of the mobile assembly provided to be activated by the electric gearshift and to determine the number of the sprocket on which the chain was transferred upon receiving the detection signal emitted by the detection means, a display manager associated with a display screen provided to blackout the displayed parameter value and replace this value with information relative to the sprocket number determined by the processing circuit, and a time delay to disable the display manager after a predetermined lapse of time.

BRIEF DESCRIPTION OF DRAWINGS

The invention will be better understood with reference to the following description and the attached drawings which are an integral part thereof, and in which:

FIG. 2 schematically shows the various functions of the unit according to the invention;

FIG. 3 schematically shows the indexing device of the gearshift in FIG. 2;

FIG. 4 shows in three sub-figures 4a, 4b, 4c a first functioning mode of the display unit; and FIG. 5 shows in five sub-figures 5a, 5b, 5c, 5d, 5e a second functioning mode.

DETAILED DESCRIPTION OF THE INVENTION

Figure 1:
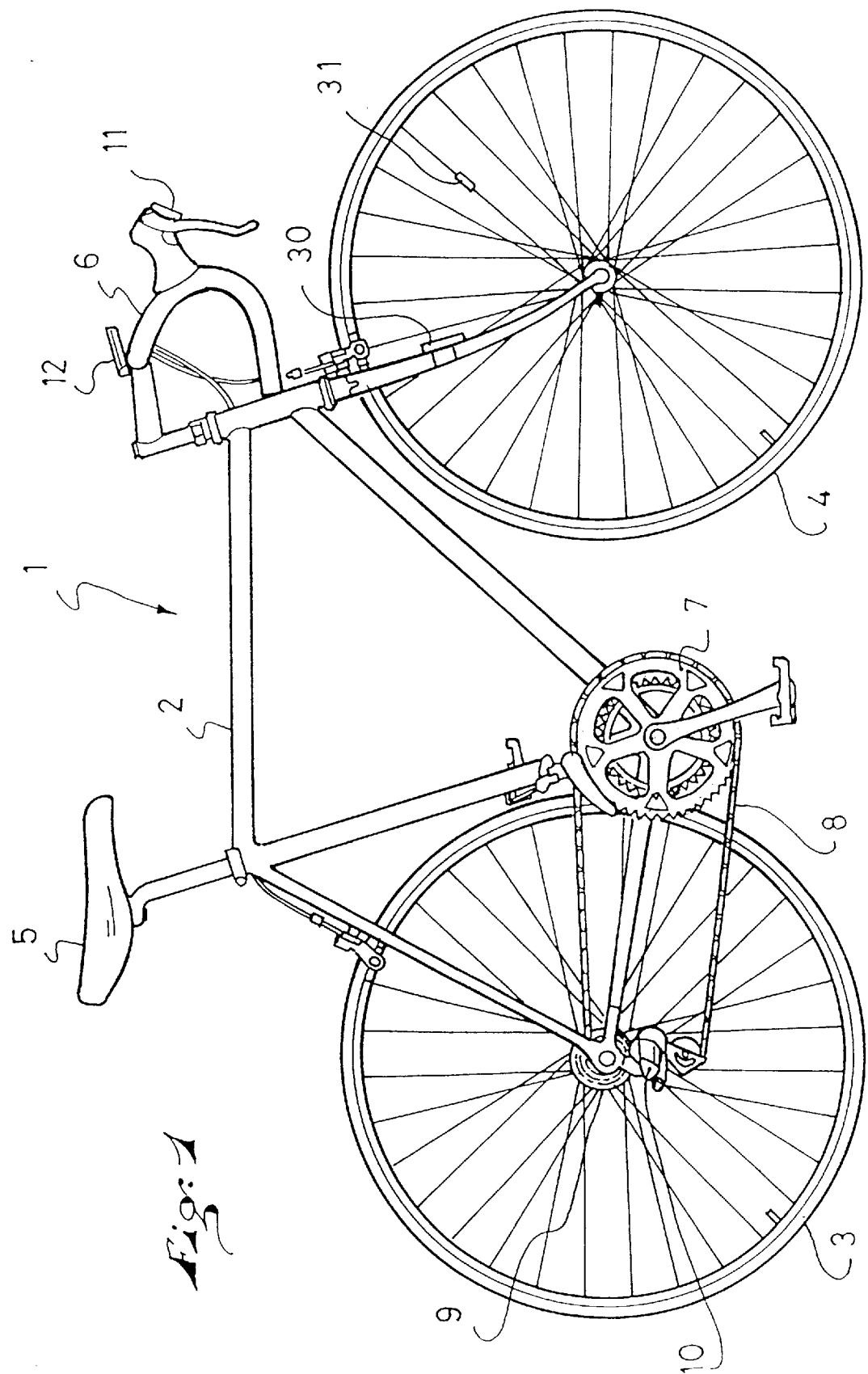
FIG. 1 shows in a general way a bicycle equipped with the display unit according to the invention.

The bicycle 1 shown in FIG. 1 has, as known, a frame 2, a front wheel 3, and a rear wheel 4, a seat 5, a handlebar with a bend 6, and a crank gear 7.

At the rear, the chain 8 is engaged with one of the sprockets of a sprocket assembly 9. Usually, the sprocket assembly is formed by a cassette of 7 to 9 sprockets. A rear gearshift 10 allows transferring the chain from one sprocket to the other.

The gearshift is the electric type and is controlled by a switch 11 located on the bend of the handlebar.

The gearshift is, for example, of the type described in European Patent Application 558 425. The gearshift 10 is provided to displace the chain step by step in either direction so as to transfer it from one sprocket to another contiguous sprocket.

The gearshift described in EP 558 425 has a main housing 14 provided to be attached to the frame, and a mobile gear shifting assembly 15 with, in particular, two intermediate gear wheels 17 and 18. The rotation of the upper wheel 17 occurs with the displacement of the chain. This causes the translational back and forth movement of a control rod inside the main housing 14. Two electromagnets, one for the rise of the sprockets and the other for the descent, are connected to the housing. They each have a plunger provided to be meshed into a tooth space of a rack which is associated therewith respectively. The two racks are carried by the control rod. The nieshing of an electromagnet plunger momentarily connects the control rod to the main housing, and by reaction displaces the mobile gear shifting assembly.

Furthermore, an indexing device allows releasing the meshing once the displacement of the mobile assembly, over one step, has occurred.

With reference to FIG. 3, the indexing device has a series of indexing notches 20 whose number is equal to the number of sprockets, and whose spacing corresponds to the displacement pitch of the mobile assembly. The notches 20 are located on the mobile gear shifting assembly. A ball 22, provided to be engaged into the various notches, is housed in the main housing 14. The ball is pushed back by a spring. Further, the ball guides a small switch 24 shaped by two washers, in that the switch 24 closes when the ball falls into a notch after a displacement. This electric signal for closing the switch 24 is sent to the processing unit, and the processing unit then returns a signal for breaking the power supply of the electromagnet. This signal is further used in the present case as a confirmation signal that the displacement requested did occur.

This construction mode is not limiting, and the indexing device could be constructed differently. The indexing signal could also be read from any other appropriate means.

In the embodiment shown, the switch 11 which controls the gearshift 10 has a tilting lever 25, with two push buttons 25a and 25b, to send a command of increase or decrease in speed to the gearshift. It is possible to equip the bicycle with a plurality of switches, such as the switch 11, placed at hand's reach from the cyclist's various postures.

In European Patent Application No. 558 425, a wire connection is provided between the switch or switches and the gearshift. This connection could also be obtained without a wire, by Hertzian waves with a data link control protocol.

It must be noted that the gearshift that has just been described is not limiting for the invention; other gearshifts are suitable, the important point being that it is provided to send, at the end of a displacement, a confirmation signal that the displacement of the mobile gear shifting assembly did in fact occur.

According to the invention, the bicycle 1 is additionally equipped with a casing 12 that includes a processing unit 27 and a display unit 28.

The processing unit 27 is connected to sensors for the performance of the bicycle or the cyclist, or for the time. For example and as shown, it is a reed contact sensor 30 carried by an arm of the front fork, and energized by the passage of a magnet 31 carried by a wheel spoke. Based on the signals emitted by this sensor, the processing unit can determine distance, speed, acceleration, etc. Another sensor is a pressure sensor 33 which allows the processing unit to calculate elvation, changes in level achieved, etc. Other sensors could also be connected to the processing unit.

The display unit 28 is provided to display the parameter values calculated by the processing unit. FIG. 2 shows two liquid crystal displays 34 and 35 which allow the simultaneous display of two different types of parameters, along with their pictographs. This is not limiting, and there could be more displays or, inversely, one single display.

Push buttons 36 are provided to change the function displayed, and to parameter the processing unit 27. Any other appropriate means is also suitable.

According to the invention, the gearshift 10 is connected to a processing circuit 38. This circuit is provided to inform on the sprocket currently in use by the chain. This information can be the sprocket number, or information related to the sprocket, for example, the number of teeth. The information given by the processing circuit is indexed by the confirmation signal coming from the switch 24, combined with another signal coming from the gearshift or the switch 11 which specifies in which direction the gearshift functioned.

The processing circuit 38 is connected to a display manager 40 which is inserted into the connection between the processing unit 27 and one of the displays, in the case of FIG. 2, it is the display 35.

The display manager 40 is activated in case of shifting gears. Its function is to blackout the current parameter display and to send the information on the sprocket coming from the processing circuit to the display. This information pertains to the sprocket being used, i.e., the sprocket towards which the chain was transferred following a shifting of gears.

Moreover, a time delay 39 is inserted between the processing circuit 38 and the display manager 40. This time delay disables the display manager after a predetermined period of time of about several seconds. The disabling annuls the display pertaining to the sprocket, and resets the display of the previously selected parameter.

FIG. 4a shows a first functioning of the device. In FIG. 4a, the display unit 28 shows the distance at the top, on the display 34, and the time elapsed at the bottom, on the display 35. When the cyclist sends a command to shift gears, the display unit continues displaying the current parameter values.

When the signal for shifting gears is emitted and processed by the processing circuit 38, the processing circuit is activated, and it sends the display manager information relating to the sprocket called, i.e., reached by the chain. The display manager 40 displays, at the bottom display 35, information relative to the sprocket reached by the chain, sprocket number 5 according to the example of FIG. 4b. This also activates the time delay circuit 39. The top display 34 continues indicating the distance traveled. Once the time has elapsed, the time delay disables the display manager, and the bottom display indicates once again the parameter value initially presented at the bottom, i.e., the time elapsed. This is shown in FIG. 4c.

FIG. 5 shows another functioning mode. In FIG. 4a, the display unit 28 indicates the distance traveled at the top and the time elapsed at the bottom. FIG. 5b corresponds to the moment when the cyclist sends the command to shift gears. Upon receiving this signal, the processing circuit is activated, and it sends to the display manager information relative to the sprocket being used, for example, its number. The number of the sprocket being used at that moment appears in a blinking mode or in a flickering mode on the display 35. Then, the processing circuit sends information relative to the sprocket called, for example, its number. This number starts blinking on the display 35, as shown in sub-FIG. 5c. Once the confirmation signal is received, the processing circuit sends a confirmation signal, the number of the sprocket reached by the chain appears fixedly during a predetermined period. This corresponds to FIG. 5d. After this time has elapsed, the display manager is disabled, and the initial time display reappears on the bottom display 35, as shown in FIG. 5e.

Other functioning modes can be adopted, the important point being that the information relative to the sprocket called is displayed for a limited time only after a confirmation signal of the displacement of the gearshift was received by the processing circuit.

The instant application is based upon the French Patent Application No. 97 13082, filed Oct. 10, 1997, the disclosure of which is hereby incorporated by reference thereto in its entirety, and the priority of which is hereby claimed under 35 USC 119.

What is claimed is:

1. A display device provided to be associated, on the one hand, with an electric gearshift, comprising at least one control switch, one mobile gear shifting assembly, means for a reversible displacement of the mobile assembly step by step, and, on the other hand, with at least a sensor of at least one performance parameter of the bicycle or the cyclist or a parameter external to the bicycle and the cyclist, the unit itself comprising means for processing the different parameters picked up by the sensors, a display unit with at least one screen for displaying one of the parameter values calculated by the processing unit, wherein it comprises a processing circuit connected to the means for detecting the displacement of the mobile assembly provided to be activated by the electric gearshift and to determine the number of the sprocket on which the chain was transferred upon receiving the detection signal emitted by the detection means, a display manager associated with a display screen provided to blackout the value of the displayed parameter and to replace this value with information relative to the sprocket number determined by the processing circuit, and a time delay to disable the display manager after a predetermined lapse of time.

2. A device according to claim 1, wherein the display manager is inserted into the connection between the processing unit of one of the displays and the display.

3. A device according to claim 1, associated with an electric gearshift, wherein the electric gearshift has means for emitting a confirmation signal that the displacement of the gearshift did occur.

4. A device according to claim 3, wherein the processing circuit controls the display manager upon receiving the confirmation signal of the displacement of the gearshift.

5. A device according to claim 4, wherein the processing circuit sends to the display manager the information relative to the sprocket called upon receiving the confirmation signal of the displacement of the gearshift.

6. A device according to claim 3, wherein the processing circuit controls the display manager at the command to shift gears and upon receiving the confirmation signal of the displacement of the gearshift.

7. A device according to claim 6, wherein the processing circuit sends to the display manager the information relative to the sprocket called upon receiving the confirmation signal of the displacement of the gearshift.

* * * * *